(12) United States Patent
Zaitsev (10) Patent No.: US 8,762,948 B1
(45) Date of Patent: Jun. 24, 2014

(54) SYSTEM AND METHOD FOR ESTABLISHING RULES FOR FILTERING INSIGNIFICANT EVENTS FOR ANALYSIS OF SOFTWARE PROGRAM

(71) Applicant: Kaspersky Lab ZAO, Moscow (RU)

(72) Inventor: Oleg V. Zaitsev, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/722,619

(22) Filed: Dec. 20, 2012

(51) Int. Cl.
*G06F 9/44* (2006.01)

(52) U.S. Cl.
USPC .......................... 717/124; 717/127; 717/128

(58) Field of Classification Search
USPC .................. 717/124–131, 140–143
See application file for complete search history.

(56) References Cited

U.S. PATENT DOCUMENTS

| | | | | |
|---|---|---|---|---|
| 6,493,868 | B1 * | 12/2002 | DaSilva et al. | 717/105 |
| 6,698,012 | B1 * | 2/2004 | Kossatchev et al. | 717/126 |
| 6,901,581 | B1 * | 5/2005 | Schneider | 717/124 |
| 6,947,983 | B2 * | 9/2005 | Corl et al. | 709/224 |
| 7,024,694 | B1 | 4/2006 | Ko | |
| 7,143,394 | B1 * | 11/2006 | Shadmon et al. | 717/130 |
| 7,194,732 | B2 * | 3/2007 | Fisher et al. | 717/131 |
| 7,340,777 | B1 | 3/2008 | Szor | |
| 7,451,216 | B2 * | 11/2008 | McKinley et al. | 709/225 |
| 7,512,977 | B2 * | 3/2009 | Cook et al. | 726/22 |
| 7,530,106 | B1 | 5/2009 | Zaitsev | |
| 7,549,164 | B2 * | 6/2009 | Cook et al. | 726/22 |
| 7,685,271 | B1 * | 3/2010 | Schneider et al. | 709/224 |
| 7,707,189 | B2 | 4/2010 | Haselden et al. | |
| 7,797,686 | B2 * | 9/2010 | Agarwala et al. | 717/128 |
| 7,823,135 | B2 * | 10/2010 | Horning et al. | 717/127 |
| 7,886,271 | B2 * | 2/2011 | Agarwala et al. | 717/124 |
| 7,945,898 | B1 * | 5/2011 | Episkopos et al. | 717/124 |
| 7,950,004 | B2 * | 5/2011 | Vieira et al. | 717/125 |
| 8,122,436 | B2 * | 2/2012 | Costa et al. | 717/128 |
| 8,166,459 | B2 * | 4/2012 | Suenbuel | 717/124 |
| 8,321,842 | B2 * | 11/2012 | Xu et al. | 717/127 |
| 8,375,366 | B2 * | 2/2013 | Agarwala et al. | 717/124 |
| 8,499,283 | B2 * | 7/2013 | Mony | 717/115 |
| 8,566,943 | B2 * | 10/2013 | Martynenko et al. | 726/24 |
| 2006/0195745 | A1 | 8/2006 | Keromytis et al. | |
| 2011/0041179 | A1 | 2/2011 | Staahlberg | |

OTHER PUBLICATIONS

Tahan et al, "Mal-ID: Automatic Malware Detection Using Common Segment Analysis and Meta-Features", Journal of Machine Learning Research—13, pp. 949-979, 2012.*
Egele et al, "A Survey on Automated Dynamic Malware-Analysis Techniques and Tools", ACM Computing Surveys, vol. 44, No. 2, Article 6, pp. 1-42, 2012.*
Bodden et al, "Finding Programming Errors Earlier by Evaluating Runtime Monitors Ahead-of-Time", ACM, pp. 36-47, 2008.*
Wichmann et al,"Using Infection Markers as a Vaccine against Malware Attacks", IEEE, pp. 737,742, 2012.*

* cited by examiner

*Primary Examiner* — Anil Khatri
(74) *Attorney, Agent, or Firm* — Patterson Thuente Pedersen, PA (57) ABSTRACT

Systems and methods for generating a set of event filtering rules for filtering events being produced in response to emulation of a program. A plurality of sample programs is constructed based on a plurality of known program development tools. Emulated execution of the plurality of sample programs is carried out in an isolated virtual machine environment and events occurring in the virtual machine environment as a result of the emulated execution of the plurality of sample programs are recorded in an event log. A set of rules is formulated for distinguishing events from among the event log that are determined to be insignificant with respect to malware detection processing to be performed.

26 Claims, 9 Drawing Sheets

SYSTEM AND METHOD FOR ESTABLISHING RULES FOR FILTERING INSIGNIFICANT EVENTS FOR ANALYSIS OF SOFTWARE PROGRAM

FIELD OF THE INVENTION

The invention relates generally to data processing systems and methods and, more particularly, to generating a set of event filtering rules for filtering events being produced in response to emulation of a program.

BACKGROUND OF THE INVENTION

Currently, the spread of malicious software is increasing every day, as does the damage caused by such software to users' personal computers. The existing methods for protecting personal computers and computers in a corporate network are designed to discover both known and unknown threats. The methods for protection from known threats (for example, viruses, worms, Trojans, and general vulnerabilities) are usually based on signature scanning, which uses code templates obtained from known malicious programs for subsequent verification of objects. In addition, related approaches for protection from known threats include: the "white lists" technology, which uses templates of known trusted programs; the "black lists" technology; systems for verification of check sums, of metadata, etc. However, the rate with which new malicious software appears is constantly rising, which leads to an ever-increasing role for proactive protection technologies that work to the benefit of users. The methods for proactive protection generally involve a code emulator. The emulator breaks the program's byte code down to commands and runs each command in a virtual copy of the computer. This allows the protection tool to monitor the program's behavior without endangering the PC's operating system and the user's data.

Today, such emulators can also contain an analytical module, which collects information about the analyzed object, conducts research, uses such research to make conclusions on the potential malicious nature of an object, and puts together detection rules. Usually, an emulator with an analytical module performs deep analysis using rules for the detection of unknown threats. These rules were previously created by antivirus service providers. When examining applications, an emulator can use various ratings. During the emulation of applications for subsequent analysis/research, a log of events having occurred is formed, which contains both usual events associated with programs known to be safe, as well as suspicious events associated with other, unknown, programs. Based on the analysis of such an event log, during which the detection rules of events and rules of calculating security ratings are used, a final verdict is issued on the examined application indicating its harmfulness.

Today, there are various methods for filtering event logs. Usually, filtration is used in order to obtain required data from the log, depending on required criteria. However, known technologies do not effectively solve one of the main log analysis problems, namely, the fact that the analysis is very time-consuming because the event log oftentimes has grown to a colossal size during emulation, which can amount to be on the order of a million lines. Another problem has to do with making a decision during analyzing of such logs—the events which are significant for issuing a verdict become diluted among the huge number of insignificant ones.

An insignificant event is an event which is not important from the point of view of behavior during maliciousness risk analysis, because such events will happen during execution of either safe or malicious software. Consequently, insignificant events do not allow accurate determination of whether a particular item of software is dangerous. Typical examples of insignificant events are events which will be created during the execution of software written in the Delphi programming language. The execution of such applications can create many typical events found in any program created using Delphi. For example, these can include events that occur in connection with running code that was added during the compilation of the application, e.g., <<startup code>>.

One challenge in the development of systems for filtering events is the fact that the execution of training rules (whether newly-created, or adapted from previous detection rules for events having occurred) involves the risk of creating a rule that is typical for some legitimate program application, i.e. that will cause false activation of the rule. Examples of events from which rule may be falsely triggered, are those that typically occur during the execution of an application that was compressed, or encrypted, using specialized security software. A typical example of program application is a protector from probing (for example, OSProtector), which can perform many various operations in order to protect the program application from hacking, but this is not an indication of legitimacy or maliciousness of the application, because any application secured by this kind of protector will have such behavior.

In view of the above, a solution is needed to improve event log filtering specifically for malware analysis that can be performed locally on a distributed plurality of user computer systems.

SUMMARY OF THE INVENTION

One aspect of the invention is directed generally to a technique and system for preliminary filtration, i.e. by filtration as early as at the stage when the events happen and are entered in the emulation log. According to one approach, pre-formed rules for filtration of insignificant events are provided to be used for such preliminary filtration.

A system for generating a set of event filtering rules for filtering events being produced in response to emulation of a program according to one embodiment includes computing hardware, including a processor, a data store, and input/output facilities, and an operating system executable on the computing hardware. A sample program creation module is executable on the computing hardware and configured to automatically construct a plurality of sample programs based on a plurality of known program development tools (for example, different compilers and code libraries, or different packers). An emulator module is executable on the computing hardware and configured to perform emulated execution of the plurality of sample programs in an isolated virtual machine environment and record events occurring in the virtual machine environment as a result of the emulated execution of the plurality of sample programs in an event log. A rule generator module is executable on the computing hardware and configured to automatically formulate a set of rules for distinguishing events from among the event log that are determined to be insignificant with respect to malware detection processing to be performed.

Optionally, an event analyzer module is executable on the computing hardware and configured to analyze events in the event log to perform the determination as to whether any of the events are insignificant. Optionally, in a related embodiment, whitelist and blacklist databases of events associated, respectively, with known non-malicious programs and known malicious programs, are employed. In a related embodiment, the insignificant event filtering rules are defined based on previous analysis of events produced from emulation of a plurality known harmless programs and a plurality of known harmful programs, wherein the event filtering rules define insignificant events as those not strongly associated with known harmful activity.

Another aspect of the invention is directed to a computer-implemented method for generating a set of event filtering rules for filtering events being produced in response to emulation of a program, the method being executed by a computer system having computing resources including a processor, a data store, input/output facilities, and an operating system executable on the processor. The method includes: constructing a plurality of sample programs based on a plurality of known program development tools; performing emulated execution of the plurality of sample programs in an isolated virtual machine environment and recording events occurring in the virtual machine environment as a result of the emulated execution of the plurality of sample programs in an event log; and formulating a set of rules for distinguishing events from among the event log that are determined to be insignificant with respect to malware detection processing to be performed.

In a related aspect of the invention, a security arrangement is provided for detecting a presence of malware in an unknown program stored in a computer system. The security arrangement includes computing hardware, including a processor, a data store, and input/output facilities, and an operating system executable on the computing hardware. A performance assessment module is executable on the computing hardware and configured to perform assessment of the unknown program and record, in a local event log, events occurring as a result of the performance assessment of the unknown program. An event filtering module is executable on the computing hardware and configured to filter the local event log, based on event filtering rules, to produce a filtered event log that excludes events determined to be insignificant with respect to malware detection processing to be performed. An event filtering rules database is implemented in the data store that contains the event filtering rules usable by the event filtering module to identify the insignificant events to be excluded, the event filtering rules being defined based on previous analysis of events produced from emulation of a plurality of sample programs carried out by a remote service, wherein the remote service constructs a plurality of sample programs based on a plurality of known program development tools, performs automated assessment of the plurality of sample programs and records events occurring as a result of the assessment in a remote service event log, and formulates a set of rules for distinguishing events from among the event log that are determined to be insignificant with respect to malware detection processing to be performed.

Advantageously, the preliminary filtration of a event log created during the emulation of an application, reduces its size by finding and deleting insignificant events. One of technical outcomes of this invention relates to improving the quality of the analysis of a event log built during emulation of applications, which is achieved through preliminary filtration of insignificant events in the specified log using the created rules for filtration of insignificant events.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

Figure 1A:
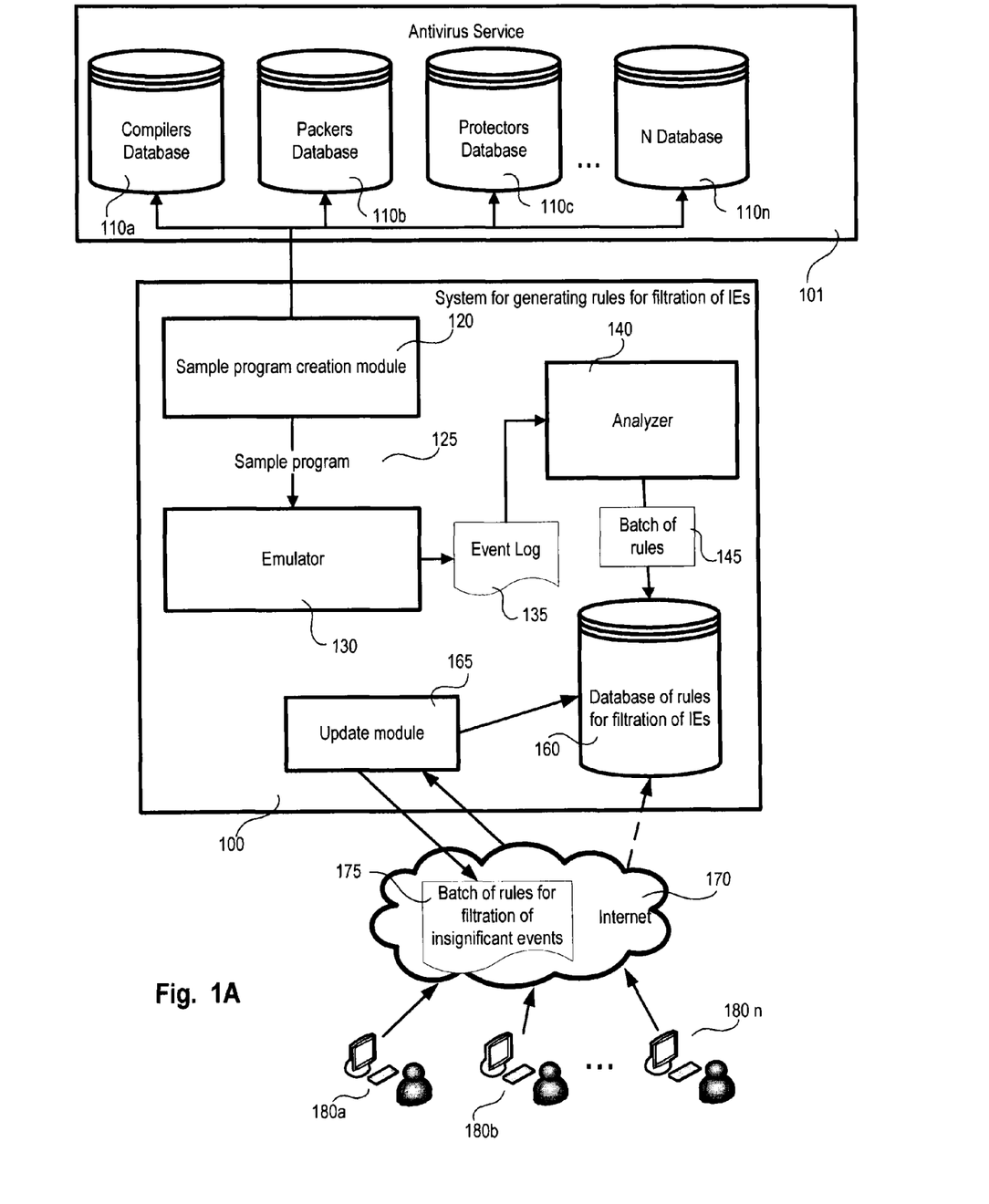
FIGS. 1A, 1B, and 1C are block diagrams illustrating examples of a systems for generating rules for filtration of insignificant events according to various embodiments of the invention.
Figure 1B:
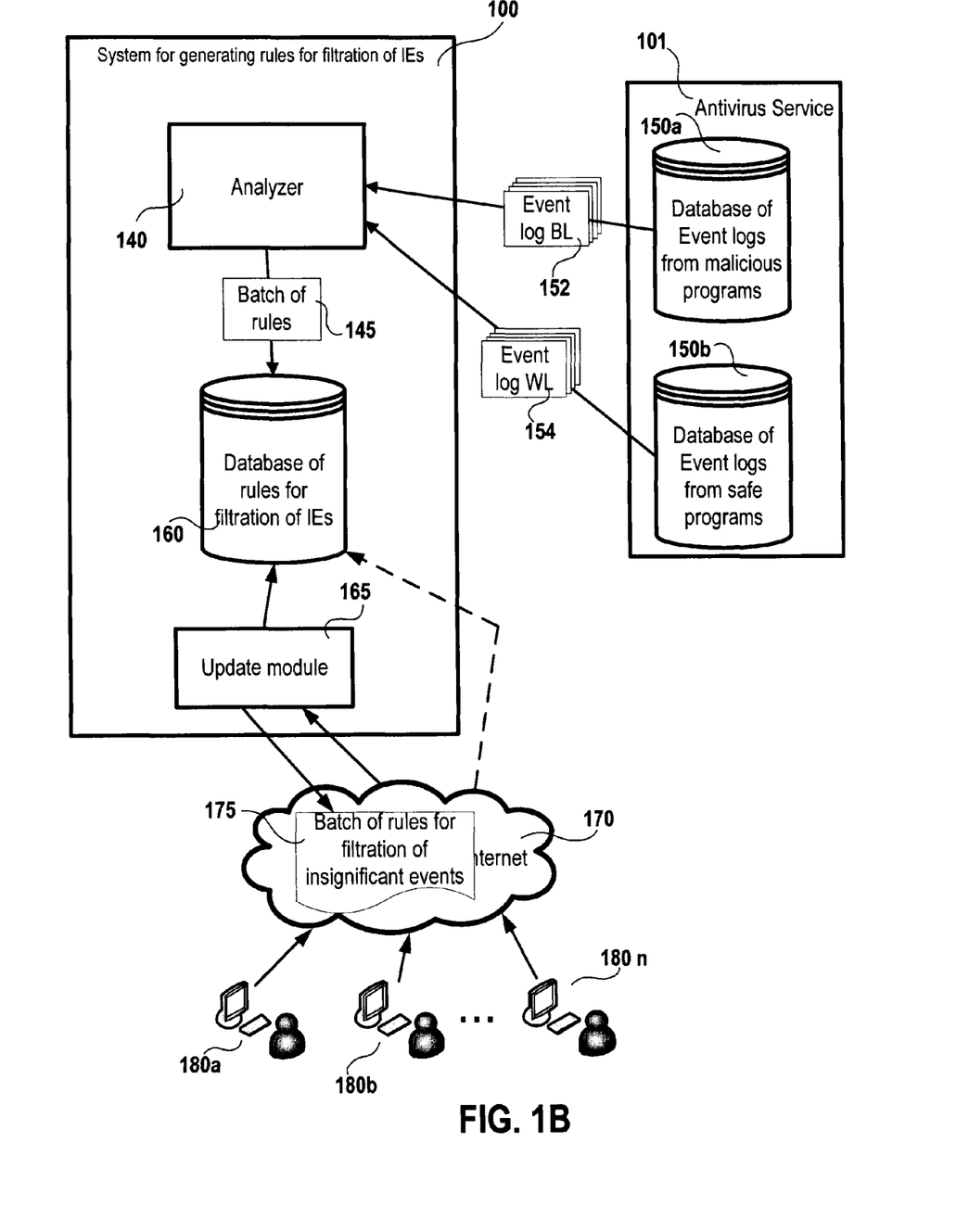
Figure 1C:
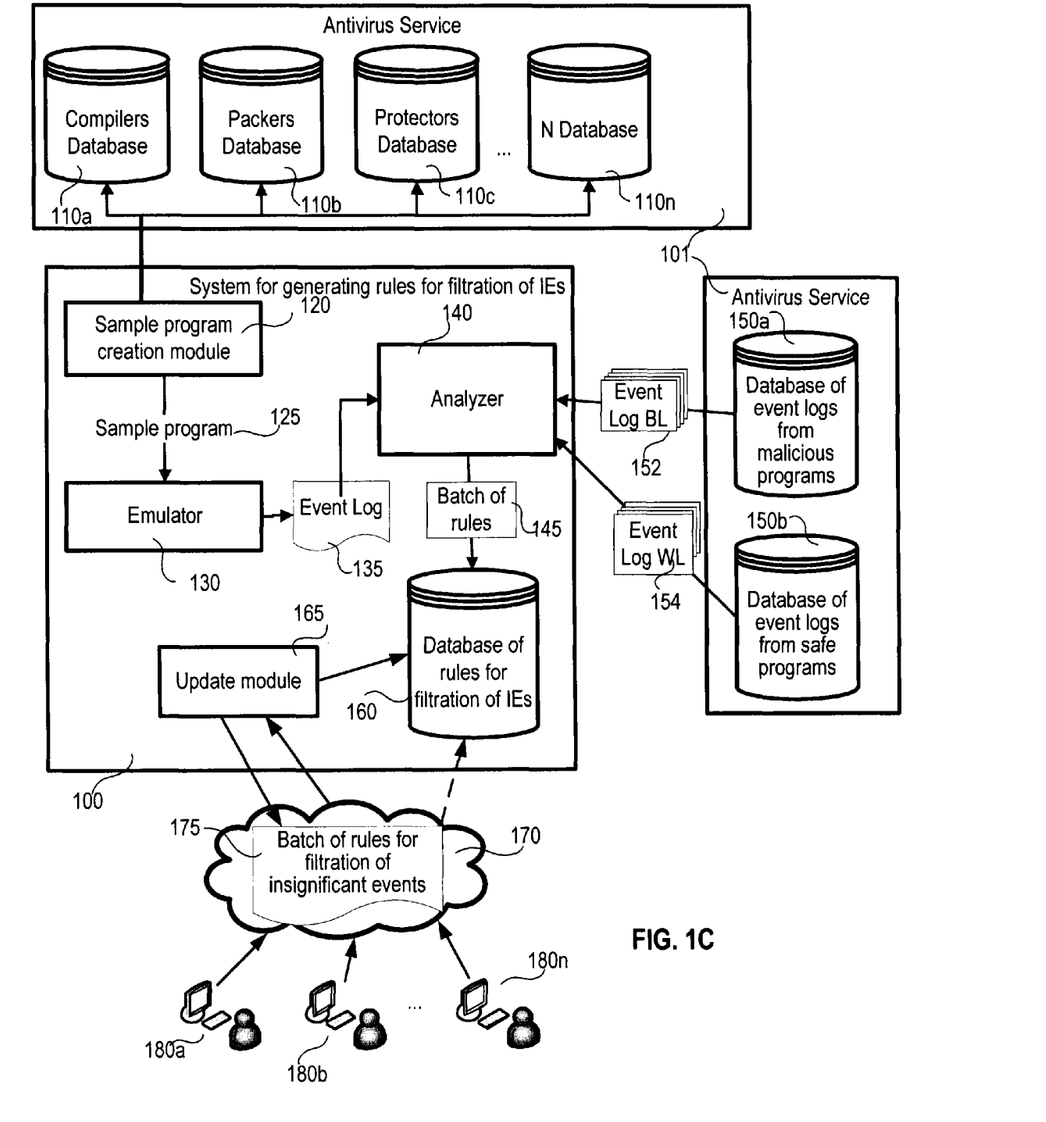

In the system block diagrams, such as those depicted in FIGS. 1A-1C, various modules are represented, such as analyzer 140, emulator 130, sample program creation module 120, and update module 165. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein.

As various the embodiments of the present invention, systems for building rules for filtration of insignificant events (IEs) are depicted in FIG. 1A, FIG. 1B and FIG. 1C. An application emulator is usually a part of an antivirus tool, which, when checking software, performs a search for unknown malicious objects on user PCs. An executable file can be considered as an object, for example, [name].exe. Before this file is it is run, it is checked (i.e., audited) with an application emulator. The application emulator breaks the application's byte code down to commands, and then it runs each command in a virtual computing environment, such as a virtual machine representing a copy of the actual computer system. This allows monitoring the behavior of the application. During the verification of application, at the time of execution of each command or set of commands, events are created, which, after preliminary analysis, will be entered in the event log for subsequent analysis (for detection of malicious application). During the preliminary analysis, rules for filtration of insignificant events are applied on the user PC's side.

If an event which happened during the emulation of an application was identified by any rule for filtration of insignificant events, that event will be deemed insignificant and will not be added to the event log. But if the event was not identified by any rule, such event will be entered in the event log for subsequent analysis by other antivirus tools, for example, using the system described in U.S. Pat. No. 7,530, 106, the disclosure of which is incorporated by reference herein. After that, a final verdict will be issued as to maliciousness of the application under review.

An insignificant event is an event which is not meaningful from the point of view of analysis of the maliciousness the behavior of a program because such event will happen during the execution of either safe or malicious program applications. Consequently, such events do not contribute meaningfully to the accurate determination of the benign/malicious nature of an application. Moreover, such events are not only useless for the analysis of emulation event logs, but also detrimental, because they increase the size of the emulation event log by tens or hundreds of times, which complicates detection of malicious actions and burdens the available computing resources, thus causing increased processing time, reduced system responsiveness, etc. It should be also noted that insignificant events affect the building of rules for analyzing event logs during emulation, because such rules can be created on the basis of an insignificant event, which can adversely affect the accuracy of the analysis based on such rules.

For illustration purposes, examples of insignificant events include:

1) a call for <<GetVersion( )>>—a request for the operating system version. Any application written in the Delphi 7 programming language will make this request, but such request does not indicate whether an application is malicious or not;

2) a call for <<RegOpenKeyEx(0x80000001, "Software\Borland\Locales" , , , );>>—this action will also be performed in case of execution of any application written in Delphi 7, and does not allow to determine what kind of application it is, either;

3) a call for <<GetModuleHandle("USER32.DLL");>>—this action is proper to 80% of all executable files; consequently, this action will be performed in case of execution of both safe and malicious applications.

It should be noted in other related embodiments, systems for filtering events from event logs to be formed and analyzed in assessing software (e.g., software applications) can be used with other tools for assessing performance of software. For example, disassembler and tracer tools can be used in lieu of an emulator. In a related embodiment, a combination of such tools is contemplated. However, for the sake of brevity, the embodiments detailed herein are presented in the context of use of an emulator as the software performance assessment tool.

FIG. 1A is a block diagram illustrating a system for generating rules for filtration of insignificant events. In one of the embodiments, the system for generating rules for filtration of IEs 100 interacts with an antivirus service 101. An example of an antivirus service 101 can be the Kaspersky® Security Network service. Antivirus service 101 can be placed either on a server or on one of user PCs 180a-180n. The antivirus service 101 contains various information on the software produced by developer companies, such as Microsoft®, and later operating on user PCs 180a-180n. All information on various programs is stored in relevant knowledge bases, such as information databases 110a-110n, for example. Information databases 110a-110n can be located either separately (on the antivirus service 101) from other tools of the system 100, or together. Information contained in the information databases 110a-110n can consist in the application (file) itself, or in any information about them—for example, application metadata, parts of a program code, the application's hash sum, etc. The information databases 110a-110n are built by application types; for example, a database of compilers 110a, a database of packers 110b (applications for compression of an executable file), a database of protectors/encryptors 110c (applications for compression and encryption of an executable file), a database of archivers, etc.

The system generating rules for filtration of IEs 100 requests data from databases 110a, 110b, 110c, . . . , 110n on the compilers, packers, protectors and other programs contained in them, which are sent to the sample program creation module 120. In various embodiments, the information that will be transferred can be the executable file of the compiler, packer, protector, etc., or the path to that executable file. The sample program creation module 120 processes the received information (for example, executable file of the compiler) and uses it to build a sample program 125, which is sent to the emulator 130.

It should be noted that the created sample program 125 is a simplest application which does not carry out any particular functionality, but serves mainly for analyzing the behavior (e.g., defining events) of the application which was used to launch it. For example, each compiler from the 110a database has a standard list of events, which will be executed during the execution of the applications created (e.g., compiled) using relevant compiler. The following application is an example of a simplest application created using a compiler for the Delphi programming language:

Begin
End.

In related embodiments, it is also possible to connect various standard libraries to this application, which will be called during the execution of the application. In this case, the sample program 125 written in the Delphi programming language can look as follows:

unit Unit1;
interface
uses

Windows, Messages, SysUtils, Variants, Classes, Graphics, Controls, Forms, Dialogs, DB, OracleData, Oracle, StdCtrls, urlmon, ExtCtrls, Spin,
IdBaseComponent, IdComponent, IdTCPConnection, IdTCPClient, IdHTTP, IdMultipartFormData,
AbUnZper, AbUtils, AbArcTyp, INIFiles, RxVerInf, IdUDPBase, IdUDPClient, IdDNSResolver, ComObj, Math;
type
TMain=class(TForm)
end,
var
Main: TMain;
implementation
begin
end.

If the data was received from databases 110b or 110c, the sample program 125 will be an application created (i.e., written) in any programming language, and in this case it will be compressed by a relevant packer or protector, information on which was provided to the module 120.

The emulator 130 performs emulation of the obtained sample program 125, during which it records all created events in the events log 135. The emulation of the sample program 125 means breaking its program code down to instructions and imitating their execution. Then, the emulator 130 sends the built event log 135 to the analyzer 140.

It should be noted that all events from the event log 135 will be insignificant events, because the specified events will be proper to any application created with the help of the compiler being analyzed or packed with the help of the protector or packer being analyzed, regardless of whether the application is safe or malicious.

Based on each event from the received event log 135, the analyzer 140 creates a rule for filtration of insignificant events. A filtration rule is a Boolean characteristic and contains a name of an API function and masks for its arguments (a number of arguments from 1 to N). Each argument of the mask can adopt the following values:
- -NULL-—indicates that the function's argument must be empty;
- *—any argument value;
- a specific argument value (in this case, the argument value and the set value will be compared until full coincidence).

An example of such API function (rule for filtration of insignificant event) is the SysAllocString function with three arguments (*, -NULL-, -NULL-), where the first argument is any argument and the other ones are absent.

The analyzer 140, on the basis of created rules for filtration of insignificant events, builds a batch of rules 145, which it then sends to the database of rules for filtration of IEs 160.

The database of rules for filtration of IEs 160 adds the received batch of rules 145 to the table of rules for filtration of insignificant events for subsequent storage. Once the batch of rules 145 is added to the database 160, the version of the database is changed and sent to the update module 165. Table 1 below is an example of a set of rules for filtration of insignificant events:

TABLE 1

| API FUNCT | ARG1 | ARG2 | ... | ARGN |
| --- | --- | --- | --- | --- |
| CoInitialize | -NULL- | -NULL- | ... | -NULL- |
| CoCreateInstance | -NULL- | -NULL- | ... | * |
| GetStringType | -NULL- | -NULL- | ... | "","", |
| SysAllocString | * | -NULL- | ... | -NULL- |
| WideCharToMultiByte | -NULL- | -NULL- | ... | * |
| LCMapString | -NULL- | -NULL- | ... | "","", |
| GetModuleFileName | -NULL- | -NULL- | ... | -NULL- |
| GetFileType | * | -NULL- | ... | -NULL- |
| LoadLibrary | shell32.dll | -NULL- | ... | -NULL- |
| LoadLibrary | kernel32.dll | -NULL- | ... | -NULL- |
| LoadLibrary | ole32.dll | -NULL- | ... | -NULL- |
| RegSetValueEx | \Registry\Machine\Software\Classes\.key | -NULL- | ... | ,,"regfile", |
| RegOpenKeyEx | 0x80000000 | .key | ... | ,, |
| RegSetValue | 0x80000000 | .key | ... | ,"", |
| CreateDirectory | C:\DOCUME~1\ADMINI~1\LOCALS~1\Temp\ | -NULL- | ... | -NULL- |
| ... | ... | ... | ... | ... |

In the above table, the first column (API_FUNCT) contains names of API functions, and the next columns (ARG1, ARG2, . . . , ARGN) contain arguments of functions.

It should be also noted that the system for generating rules for filtration of IEs 100 will provide the rules for filtration of IEs from the database of rules for filtration of IEs 160 to the antivirus tools existing on user PCs 180a, 180b, . . . , 180n, if a request is received from these antivirus tools. In this case, all interactions between the system for generating rules for filtration of IEs 100 and the user PCs 180a, 180b, . . . , 180n pass through the Internet network 170.

In one example embodiment, the interaction between the database of rules for filtration of IEs 160 and the user PCs 180a, 180b, . . . , 180n happens through an update module 165. In this case, the update module 165 contains a current version of the database 160. Then, if a request is received from antivirus tools existing on the user PCs 180a, 180b, . . . , 180n or on other devices, the update module 165 will compare the received version of the database with its own version of the database 160. If the versions coincide, the antivirus tools on the user PCs 180a, 180b, . . . , 180n already contain a current database of rules for filtration of IEs. If the versions are different, a batch of rules for filtration of insignificant events 175 will be built. The batch 175 will contain all filtration rules created after the provided version of the database of rules from the user PCs 180a, 180b, . . . , 180n. Then, the batch 175 will be sent to the antivirus tools on user PCs 180a, 180b, . . . , 180n.

FIG. 1B shows another example embodiment of a system for generating rules for filtration of insignificant events. In this embodiment, the system for generating rules for filtration of IEs 100 contains only an analyzer 140, a database of rules for filtration of IEs 160 and an update module 165, and interacts with an antivirus service 101. In this embodiment, the antivirus service 101 contains two databases, 150a and 150b. The 150a database contains event logs BL 152, which were built during emulation of only malicious applications. The 150b database contains event logs WL 154, which were built only during emulation of safe applications.

Figure 2:
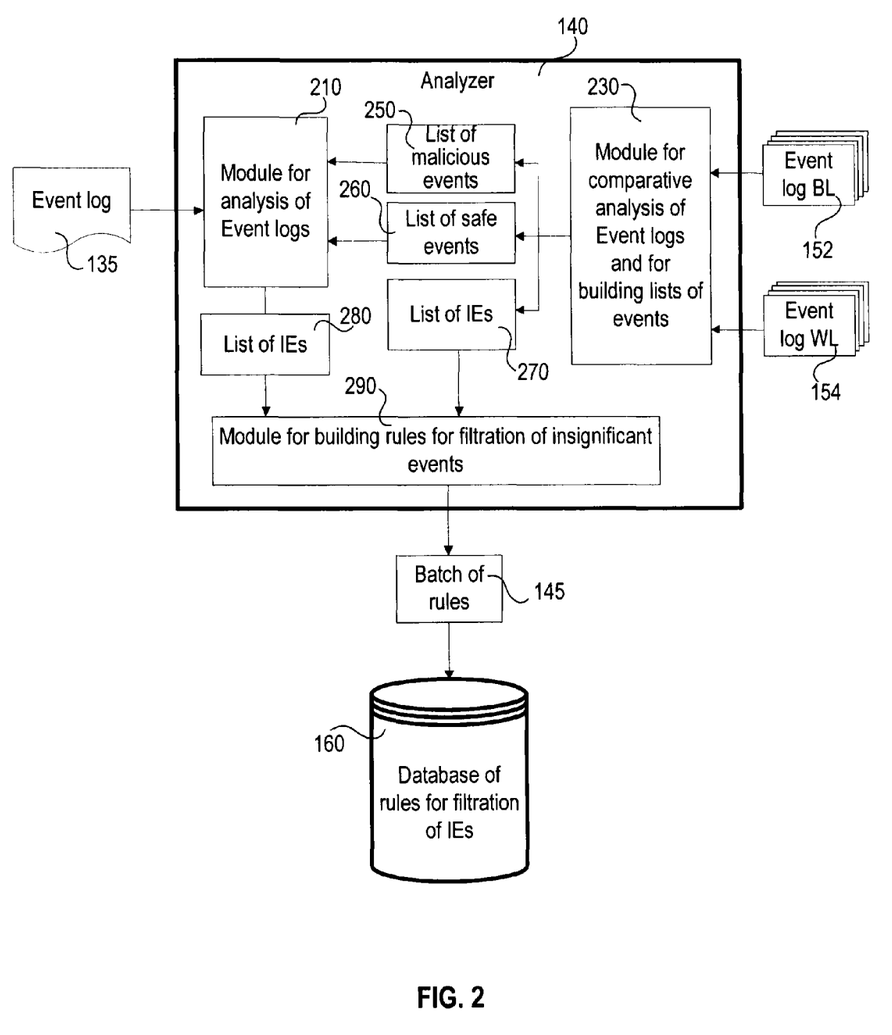
FIG. 2 illustrates a sample diagram of the operation of an analyzer when building rules for filtration of insignificant events according to one embodiment.

The analyzer 140 requests from databases 150a and 150b all event logs BL 152 and WL 154 contained in the above databases at the time of the request. Then, the analyzer 140 analyzes all received event logs 152 and 154, upon which it builds a list of insignificant events 270 (the structure of analyzer 140 is depicted in FIG. 2). The list of insignificant events 270 contains events encountered both in the event logs BL 152 and in the event logs WL 154. All events entered in the above list 270 are insignificant events.

Then, the analyzer 140, on the basis of each event from the built list of insignificant events 270, creates a rule for filtration of IEs. Then, all created rules for filtration of IEs are sent to the database of rules for filtration of IEs 160 in the form of a batch of rules 145. The database of rules for filtration of IEs 160 adds the received batch of rules 145 to the table of rules for filtration of insignificant events for subsequent storage and transfer to user PCs 180, if a request is received from them. All interactions between the system for generating rules for filtration of IEs 100 and the user PCs 180 take place through the update module 165, which, in turn, interacts with the user PCs 180 through the Internet network 170.

Another example of an embodiment of a system for generating rules for filtration of insignificant events is presented in FIG. 1C.

The embodiment of a system for generating rules for filtration of IEs shown in FIG. 1C combines the approaches shown in FIG. 1A and FIG. 1B. Also, in this embodiment, the analyzer 140 performs verification of each event from the event log 135 received from the emulator 130 for their correspondence to the insignificant event. The verification will happen using the list of safe events 260 and the list of malicious events 250 (FIG. 2). The above lists will be built by the analyzer 140 during the analysis of the event logs 152 and 154 from the 150a and 150b databases, together with the list of events 270, as shown in FIG. 1B.

Then, the analyzer 140 will compare each event from the event log 135 with the built lists of events 250 and 260.

In case if an event from the event log 135 received from the emulator 130 was found in the lists of events 250 and 260, such event is not an insignificant event and will be deleted.

In case if an event from the event log 135 received from the emulator 130 was not found in the lists of events 250 and 260, the event is an insignificant event, and the analyzer 140 builds a filtration rule based on this event. One rules are built based on the events which have passed the verification, the analyzer 140 builds a batch of rules 145, which is sent to the database of rules for filtration of IEs 160.

In one embodiment, the system for generating rules for filtration of IEs 100 can be placed on one of the users' PCs 180a-180n, which will form the new filtration rules for the IEs. Subsequently, the system 100 generates a set of rules 175 from among the new filtration rules and provide it to the appropriate anti-virus programs for users 180a-180n via the Internet 170.

Figure 1D:
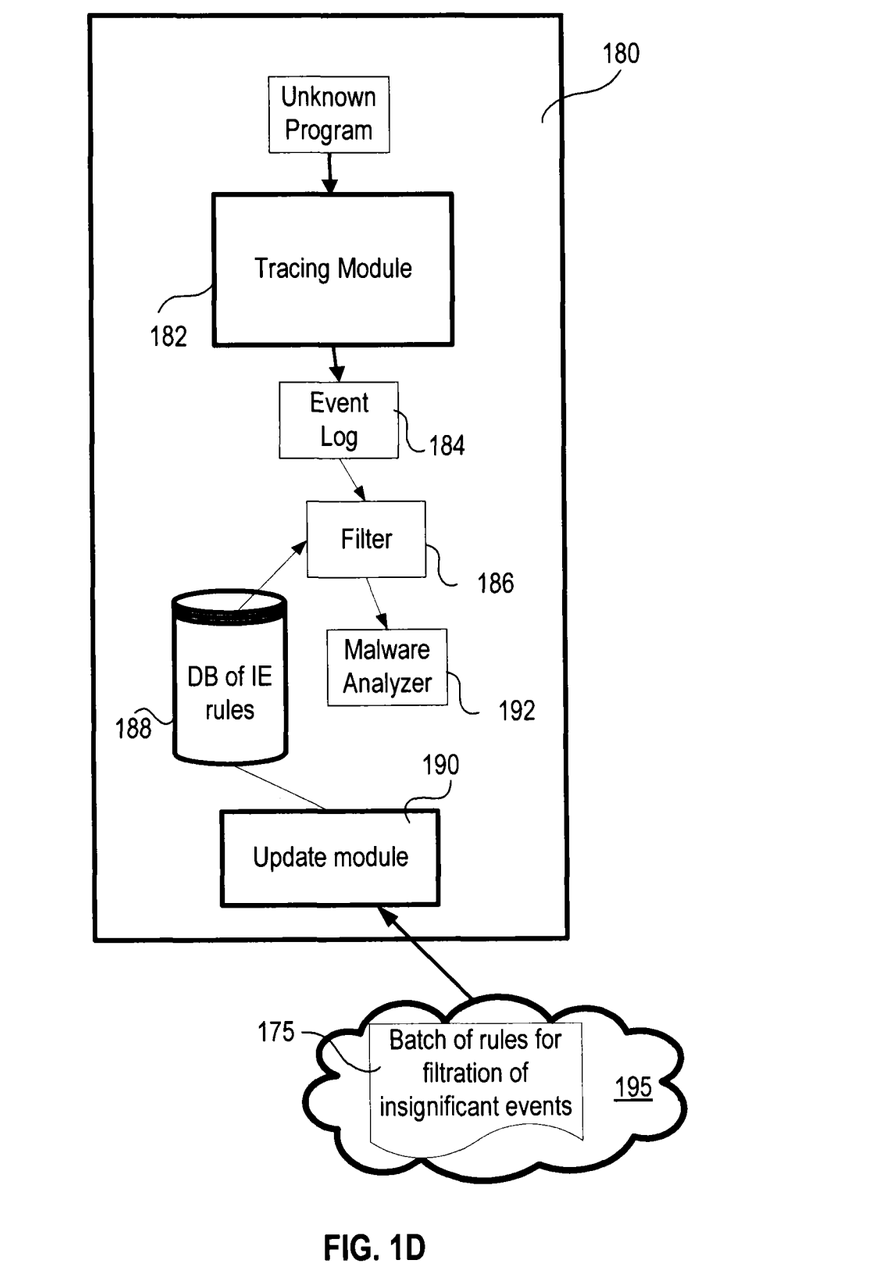
FIG. 1D is a diagram that illustrates an example of a client-side PC that conducts analysis of an unknown program and performs malware assessment based on a filtered event log from the performance assessment according to an exemplary embodiment.

FIG. 1D illustrates an example of a client-side PC 180 that conducts analysis of an unknown program and performs malware assessment based on a filtered event log from the performance assessment according to an exemplary embodiment. PC 180 includes tracing module 182, which in various embodiments can be an emulator, de-compiler, tracing tool, etc. Tracing module 182 executes or otherwise examines the unknown program, which can be performed in an isolated virtual execution environment, for example. The performance assessment produces event log 184, which normally includes mostly insignificant events insofar as malware analysis is concerned. Thus, filter 186 removes insignificant events from the event log.

Removal of the insignificant events is performed based on rules that are stored in insignificant event filtering rules database 188. Insignificant event filtering rules database 188 is updated via event filtering rules update module 190, which is communicatively coupled to a remote service 195. Remote service 195 can include an arrangement such as any of those depicted in FIGS. 1A-1C. Remote service 195 provides regular updates of rules for filtration of insignificant events, which can be provided in batches such as batch 175. The rules are stored in database 188, which is read by filter 186 to perform the filtering operation.

Once the event log 184 is filtered, it is in condition to be analyzed for the presence of malware. Malware analyzer module 192 reads the filtered event log, and performs any one or more of a variety of actions to assess the risk of the unknown program (e.g., whether the unknown program is harmful or benign). These actions can include comparisons of events against patterns of known malicious patterns or benign patterns, heuristic analyses, analysis using artificial neural network technology, fuzzy logic analysis, etc. Any suitable malware detection technique now known, or later developed, is contemplated for use with aspects of the invention.

FIG. 2 illustrates an example of a diagram of the operation of the analyzer 140 when building rules for filtration of IEs. In one embodiment, the analyzer 140 includes a module for analysis of event logs 210 (hereinafter referred to as analysis module 210), a module for comparative analysis of event logs and for building lists of events 230 (hereinafter referred to as comparative analysis module 230) and a module for building rules for filtration of insignificant events 290 (hereinafter referred to as filtration rules module 290).

Analysis module 210 is designed to analyze an event log 135 received from the emulator 130 and to provide all insignificant events to filtration rules module 290 in the form of a list of insignificant events 280. Analysis module 210 also performs preliminary verification (as described in the description of FIG. 1c) of all events from the log 135, using the list of malicious events 250 and the list of safe events 260, received from comparative analysis module 230.

Comparative analysis module 230 is designed to analyze the event logs BL 152 and the event logs WL 154, received from the databases 150a and 150b, stored on the antivirus service 101. On the basis of the performed analysis, comparative analysis module 230 builds three lists of events: a list of malicious events 250, a list of safe events 260 and a list of insignificant events 270. Then, comparative analysis module 230 provides lists 250 and 260 to analysis module 210 and provides list 270 to filtration rules module 290.

Filtration rules module 290 is designed to:
build rules for filtration of insignificant events (IEs) on the basis of the lists of insignificant events 270 and 280 received from modules 210 and 230 (as described in the description of FIG. 1a);
build a batch of rules 145 from the built rules for filtration of IEs, and
subsequent transmission of the built batch of rules 145 to the database of rules for filtration of IEs 160.

In a specific embodiment, filtration rules module 290 checks the built rules for filtration of IEs for their presence in the database of rules of filtration of IEs 160. In case if the built rules for filtration of IEs are found in the database 160, the rules will not be added to the database 160, but instead they will be deleted.

Figure 5:
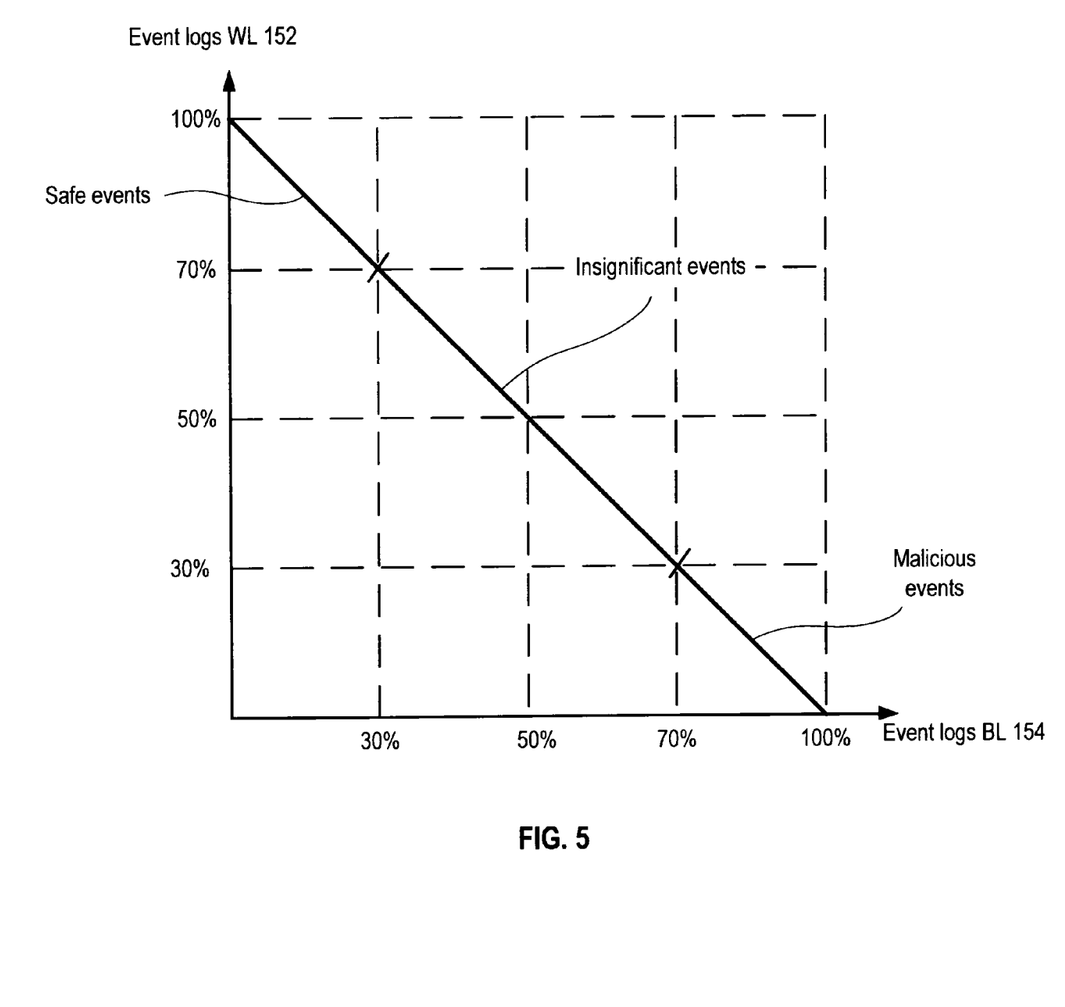
FIG. 5 illustrates exemplary limits for distinguishing between significant and insignificant events during analysis of events logs according to one embodiment.

FIG. 5 illustrates in more detail an example set of criteria (e.g., limits) for selection of insignificant events during the analysis of events from the 152 and 154 event logs. First, all events from both types of event logs will be selected. Then, each event will be analyzed; in this case, the log where the analyzed event was discovered will constitute 100% of events, regardless of the event type. Then, three situations are possible:

1. The event detection ratio was 30%/70% or less for the event logs WL 152, i.e. the event was detected from 0% to 30% in the event logs WL 152, and from 70% to 100% in the event logs BL 154. In this case, the event is a suspicious event and it will be added to the list of malicious events 250.

2. The event detection ratio was 30%/70% or more for the event logs WL 152, but not more than 70%, i.e. the event was detected from 30% to 70% in the event logs WL 152 and from 70% to 30% in the event logs BL 154. In this case, the event is an insignificant event and it will be added to the list of insignificant events 270.

3. The event detection ratio was 70%/30% or more for the event logs WL 152, i.e. the event was detected from 70% to 100% in the event logs WL 152 and from 30% to 0% in the event logs BL 154. In this case, the event is a potentially safe event and it will be added to the list of safe events 260.

It also should be noted that the most accurate result during the building of the lists of events 250, 260 and 270 is reached with analysis of several hundred or more event logs.

Figure 3:
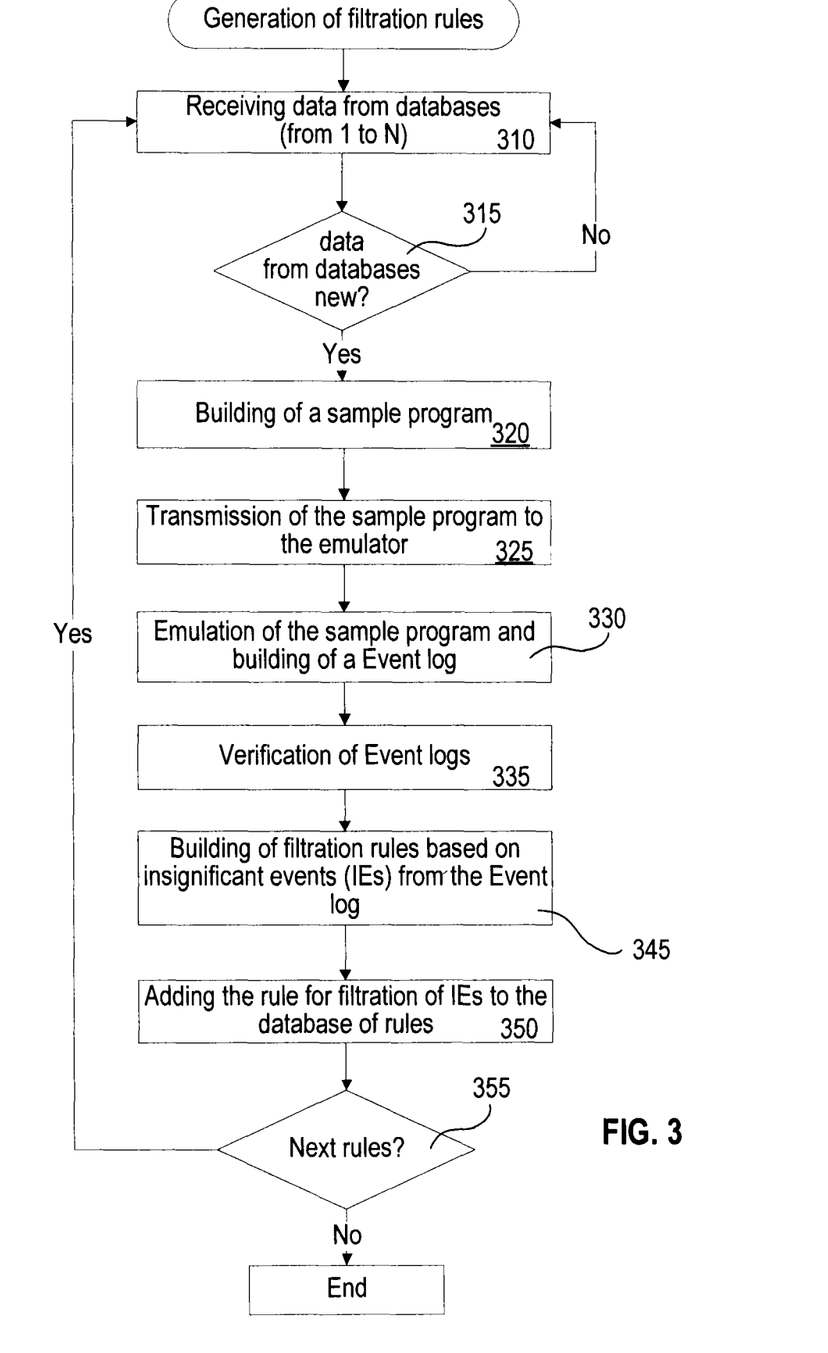
FIG. 3 illustrates a process for generating rules for filtration of insignificant events according to one embodiment.

FIG. 3 depicts a machine-implemented process which can be used to implement a system for generating rules for filtration of insignificant events. In order to create rules for filtration of IEs, at 310 the system for generating rules for filtration of IEs 100 sends a request for presence of new data for the databases from the list of databases 110*a*, 110*b*, 110*c*, . . . , 110*n*. The request can be sent either to all databases 110*a*, 110*b*, 110*c*, . . . , 110*n* at once, or successively. Having received the request, the databases 110*a*, 110*b*, 110*c*, . . . , 110*n* send all data (or information) which they store on the objects (compilers, protectors, packers, etc.) to the system for generating rules for filtration of IEs 100, and namely to the sample program creation module 120.

The data or information contained in the databases 110*a*, 110*b*, 110*c*, . . . , 110*n* may be the application itself (i.e., the file) and any data or information about it, for example, application metadata, one of more portions of the code, its hash, checksum, etc. At 315, the sample program creation module 120 checks the received data for up-to-dateness.

In one embodiment, the check of data for up-to-dateness can consist in the building of a hash sum for each set of data on each received object. The built hash sum is compared with the list of previously created hash sums, which is stored in the sample program creation module 120. In case if the built hash sum is found in the list of hash sums, the built hash sum is not new, and the module 120 will delete all data which was used to build the hash sum. In case if the built hash sum is not found in the list of hash sums, the built hash sum is new and will be added to the specified list of hash sums, while the data used to build the hash sum will be sent to block 320.

At 320, a sample program 125 is built based on the data received with the help of the module 120. At 325, the module 120 sends the sample program 125 to the emulator 130 for subsequent analysis. After that, the emulator 130 is run, and at 330, the sample program 125 is emulated. During the emulation, a event log 135 is built, where the emulator 130 records all performed actions (the events which took place) of the sample program 125. At 335, the built event log 135 is sent to the analyzer 140, which verifies it in order to detect insignificant events. The verification is performed by comparing the events from the event log with the events from the lists 250 and 260. In case if the events are not found in the above mentioned lists 250 and 260, the events are insignificant and will be added to list 280, which, after the completion of the verification, will be sent to block 345. In case if the events are found in the above mentioned lists 250 and 260, the events will be deleted, because they will not be insignificant events.

At 345, the analyzer 140 builds rules for filtration based on the events from the received list 280. The building of rules for filtration of insignificant events happens as shown in FIG. 1*a*. At 350, the built rules are added to the database of rules for filtration of IEs 160 for subsequent storage, pre-built in the form of a batch of rules 145. At 355, it is decided whether to continue building rules for filtration of insignificant events or to end operation. In case if all data received from information databases 110*a*, 110*b*, 110*c*, . . . , 110*n* were analyzed, the operation will end. In case if not all data from the databases 110*a*, 110*b*, 110*c*, . . . , 110*n* were analyzed, the system 100 will go back to 310.

Figure 4:
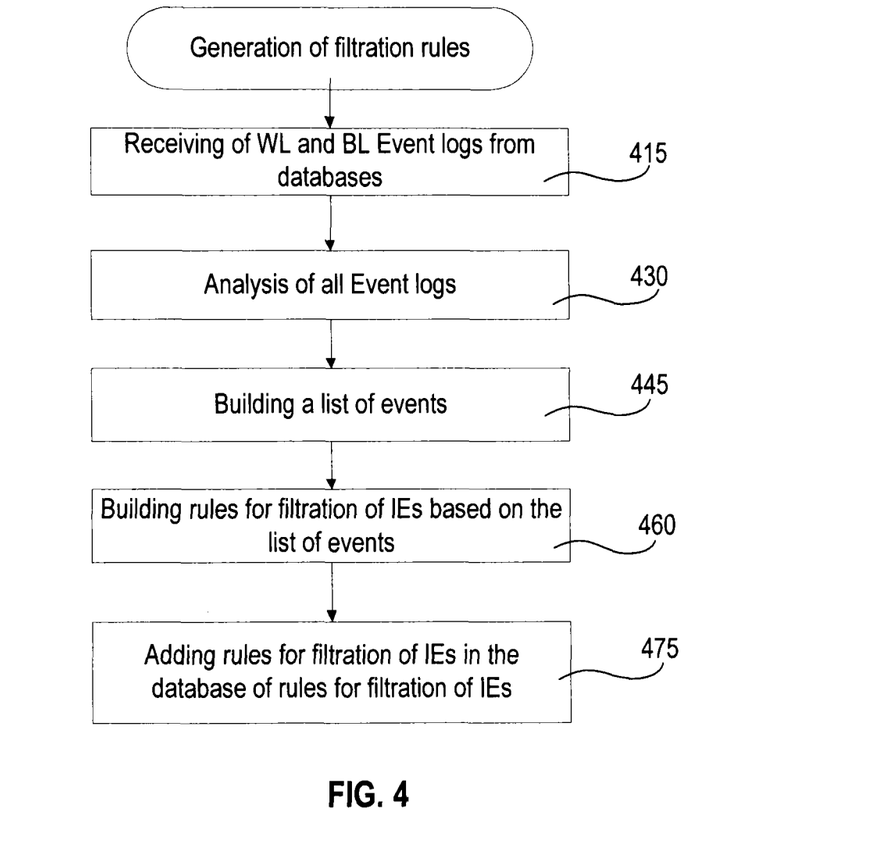
FIG. 4 illustrates an example process for generating rules for filtration of insignificant events utilizing whitelists and blacklists according to one embodiment.

FIG. 4 depicts a machine-implemented process for generation of rules for filtration of insignificant events. At 415, the analyzer 140 receives at least one event log BL 152 from database 150*a*, and at least one event log WL 154 from database 150*b*. At 430, the analyzer 140 compares all received event logs and detects the events encountered both in BL 152 and in WL 154. At 445, the analyzer 140 builds a list of events from the events which were included in both types of lists. Based on this list of events, the analyzer 140 at 460 builds rules for filtration of IEs. After that, from the created rules for filtration of IEs, it builds a batch of rules 145, which it then sends to the database of rules for filtration of IEs 160. At 475, the database 160 will add the rules for filtration of IEs from the received batch of rules 145 to the table of rules for filtration of insignificant events for subsequent storage.

Figure 6:
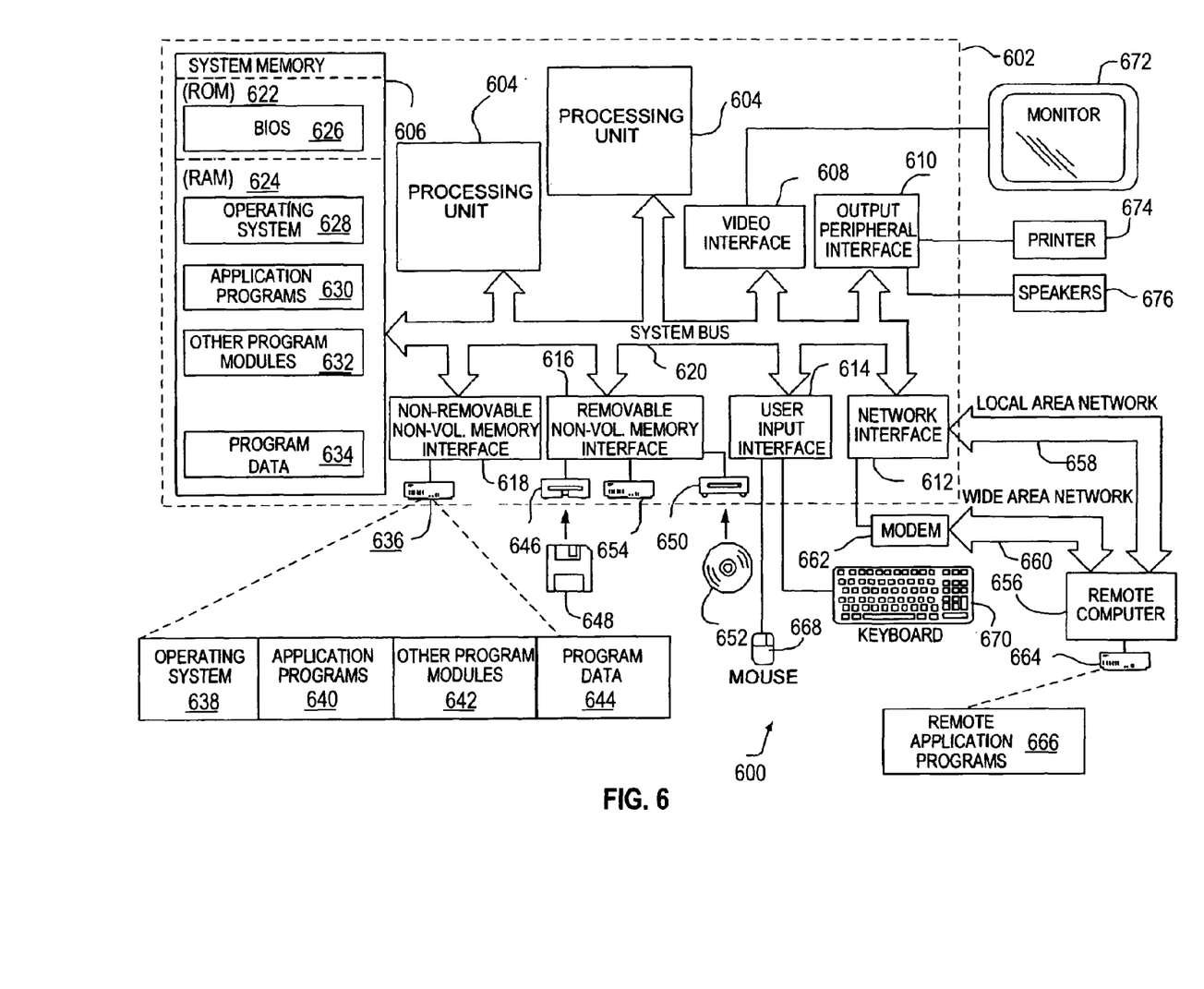
FIG. 6 is a block diagram of a general-purpose computer system in which embodiments of this invention can be realized.

FIG. 6 is a diagram illustrating in greater detail a computer system 600 on which aspects of the invention as described herein may be implemented according to various embodiments. The computer system 600 may include a computing device such as a personal computer 602. The personal computer 602 includes one or more processing units 604, a system memory 606, a video interface 608, an output peripheral interface 610, a network interface 612, a user input interface 614, removable 616 and non-removable 618 memory interfaces and a system bus or high-speed communications channel 620 coupling the various components. In various embodiments, the processing units 604 may have multiple logical cores that are able to process information stored on computer readable media such as the system memory 606 or memory attached to the removable 616 and non-removable 618 memory interfaces 618. The computer 602 system memory 606 may include non-volatile memory such as Read Only Memory (ROM) 622 or volatile memory such as Random Access Memory (RAM) 624. The ROM 622 may include a basic input/output system (BIOS) 626 to help communicate with the other portion of the computer 602. The RAM 624 may store portions of various software applications such as the operating system 628, application programs 630 and other program modules 632. Further, the RAM 624 may store other information such as program or application data 634. In various embodiments, the RAM 624 stores information that requires low-latencies and efficient access, such as programs and data being manipulated or operated on. In various embodiments RAM 624 comprises Double Data Rate (DDR) memory, Error Correcting memory (ECC) or other memory technologies with varying latencies and configurations such as RAMBUS or DDR2 and DDR3. In this way, in various embodiments, the system memory 606 may store the input data store, access credential data store, operating memory data store, instruction set data store, analysis result data store and the operating memory data store. Further, in various embodiments, the processing units 604 may be configured to execute instructions that limit access to the aforementioned data stores by requiring access credential before access to the information is granted.

The removable 616 and non-removable 618 memory interfaces may couple the computer 602 to disk drives 636 such as SSD or rotational disk drives. These disk drives 636 may provide further storage for various software applications such as the operating system 638, application programs 640 and other program modules 642. Further, the disk drives 636 may store other information such as program or application data 644. In various embodiments, the disk drives 636 store information that doesn't require the same low-latencies as in other storage mediums. Further, the operating system 638, application program 640 data, program modules 642 and program or application data 644 may be the same information as that stored in the RAM 624 in various embodiments mentioned above or it may be different data potentially derivative of the RAM 624 stored data.

Further, the removable non-volatile memory interface 616 may couple the computer 602 to magnetic portable disk drives 646 that utilize magnetic media such as the floppy disk 648, Iomega® Zip or Jazz, or optical disk drives 650 that utilize optical media 652 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 602 may utilize the network interface 612 to communicate with one or more remote computers 656 over a local area network (LAN) 658 or a wide area network (WAN) 660. The network interface 612 may utilize a Network Interface Card (NIC) or other interface such as a modem 662 to enable communication. The modem 662 may enable communication over telephone lines, coaxial, fiber optic, powerline, or wirelessly. The remote computer 656 may contain a similar hardware and software configuration or may have a memory 664 that contains remote application programs 666 that may provide additional computer readable instructions to the computer 602. In various embodiments, the remote computer memory 664 can be utilized to store information such as identified file information that may be later downloaded to local system memory 606. Further, in various embodiments the remote computer 656 may be an application server, an administrative server, client computers, or a network appliance.

A user may enter information to the computer 602 using input devices connected to the user input interface 614 such as a mouse 668 and keyboard 670. Additionally, the input device may be a trackpad, fingerprint scanner, joystick, barcode scanner, media scanner or the like. The video interface 608 may provide visual information to a display such as a monitor 672. The video interface 608 may be an embedded interface or it may be a discrete interface. Further, the computer may utilize a plurality of video interfaces 608, network interfaces 612 and removable 616 and non-removable 618 interfaces in order to increase the flexibility in operation of the computer 602. Further, various embodiments utilize several monitors 672 and several video interfaces 608 to vary the performance and capabilities of the computer 602. Other computer interfaces may be included in computer 602 such as the output peripheral interface 610. This interface may be coupled to a printer 674 or speakers 676 or other peripherals to provide additional functionality to the computer 602.

Various alternative configurations and implementations of the computer 602 are within the spirit of the invention. These variations may include, without limitation, additional interfaces coupled to the system bus 620 such as universal serial bus (USB), printer port, game port, PCI bus, PCI Express or integrations of the various components described above into chipset components such as the northbridge or southbridge. For example, in various embodiments, the processing unit 604 may include an embedded memory controller (not shown) to enable more efficient transfer of data from the system memory 606 than the system bus 620 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for generating a set of event filtering rules for filtering events being produced in response to emulation of a program, the system comprising:
    computing hardware, including a processor, a data store, and input/output facilities;
    an operating system executable on the computing hardware;
    a sample program creation module executable on the computing hardware and configured to automatically construct a plurality of sample programs based on a plurality of known program development tools, wherein the plurality of sample programs are free of malware;
    an emulator module executable on the computing hardware and configured to perform emulated execution of the plurality of sample programs in an isolated virtual machine environment and record events occurring in the virtual machine environment as a result of the emulated execution of the plurality of sample programs in an event log;
    a rule generator module executable on the computing hardware and configured to automatically formulate a set of insignificant event filtering rules for distinguishing events from among the event log that are determined to be insignificant with respect to malware detection processing to be performed.

2. The system of claim 1, further comprising:
    an event analyzer module executable on the computing hardware and configured to analyze events in the event log to perform the determination as to whether any of the events are insignificant.

3. The system of claim 1, further comprising:
a whitelist database of events associated with known non-malicious programs;
a blacklist database of events associated with known malicious programs; and
event analyzer module executable on the computing hardware and configured to analyze the events from the whitelist and the blacklist to identify insignificant events that are defined as being associated with the whitelist and blacklist databases.

4. The system of claim 1, wherein the insignificant event filtering rules are defined based on previous analysis of events produced from emulation of a plurality of sample programs automatically created using a knowledge base of existing software development tools.

5. The system of claim 4, wherein the knowledge base includes at least one knowledge base selected from the group consisting of: a knowledge base of compilers, a knowledge base of packers, a knowledge base of protectors, a knowledge base of archivers, or any combination thereof.

6. The system of claim 1, wherein the insignificant event filtering rules are defined based on previous analysis of events produced from emulation of a plurality of sample programs carried out by a remote service.

7. The system of claim 1, wherein the insignificant event filtering rules are defined based on previous analysis of events produced from emulation of a plurality known harmless programs and a plurality of known harmful programs, wherein the event filtering rules define insignificant events as those not strongly associated with known harmful activity.

8. The system of claim 1, wherein the plurality of known program development tools are executed by a remote service.

9. The system of claim 1, further comprising: an update module executable on the computing hardware and configured to communicate with a plurality of remote workstation computers to provide an updated set of rules for distinguishing events from the event log that are determined to be insignificant with respect to malware detection processing, whereby each of the plurality of remote workstation computers is enabled to locally filter out insignificant events in response to event log generation due to emulation of unknown programs.

10. The system of claim 1, wherein the plurality of known program development tools include at least one of a plurality of different compilers, packers, protectors, encryptors and code libraries.

11. The system of claim 1, wherein the plurality of known program development tools include a plurality of different packers.

12. A computer-implemented method for generating a set of event filtering rules for filtering events being produced in response to emulation of a program, the method being executed by a computer system having computing resources including
a processor, a data store, input/output facilities, and an operating system executable on the processor, the method comprising:
constructing a plurality of sample programs based on a plurality of known program development tools, wherein the plurality of sample programs are free of malware;
performing emulated execution of the plurality of sample programs in an isolated virtual machine environment and recording events occurring in the virtual machine environment as a result of the emulated execution of the plurality of sample programs in an event log; and
formulating a set of rules for distinguishing events from among the event log that are determined to be insignificant with respect to malware detection processing to be performed.

13. The method of claim 12, further comprising:
analyzing events in the event log to perform the determination as to whether any of the events are insignificant.

14. The method of claim 12, further comprising:
accessing a whitelist database of events associated with known non-malicious programs;
accessing a blacklist database of events associated with known malicious programs; and
analyzing the events from the whitelist and the blacklist to identify insignificant events that are defined as being associated with the whitelist and blacklist databases.

15. The method of claim 12, wherein the insignificant event filtering rules are defined based on previous analysis of events produced from emulation of a plurality of sample programs automatically created using a knowledge base of existing software development tools.

16. The method of claim 12, wherein the insignificant event filtering rules are defined based on previous analysis of events produced from emulation of a plurality of sample programs carried out by a remote service.

17. The method of claim 12, wherein the insignificant event filtering rules are defined based on previous analysis of events produced from emulation of a plurality known harmless programs and a plurality of known harmful programs, wherein the event filtering rules define insignificant events as those not strongly associated with known harmful activity.

18. The method of claim 12, further comprising:
executing the plurality of known program development tools as part of constructing the plurality of sample programs.

19. The method of claim 18, wherein executing the plurality of known program development tools includes executing a plurality of different compilers and code libraries.

20. The method of claim 18, wherein executing the plurality of known program development tools includes executing a plurality of different packers.

21. The method of claim 12, further comprising:
communicating with a plurality of remote workstation computers to provide an updated set of rules for distinguishing events from the event log that are determined to be insignificant with respect to malware detection processing, whereby each of the plurality of remote workstation computers is enabled to locally filter out insignificant events in response to event log generation due to emulation of unknown programs.

22. A security arrangement for detecting a presence of malware in an unknown program stored in a computer system, the security arrangement comprising:
computing hardware, including a processor, a data store, and input/output facilities;
an operating system executable on the computing hardware;
a tracing module executable on the computing hardware and configured to perform assessment of the unknown program and record, in a local event log, events occurring as a result of the analysis of the unknown program;
an event filtering module executable on the computing hardware and configured to filter the local event log, based on event filtering rules, to produce a filtered event log that excludes events determined to be insignificant with respect to malware detection processing to be performed;

an event filtering rules database implemented in the data store that contains the event filtering rules usable by the event filtering module to identify the insignificant events to be excluded, the event filtering rules being defined based on previous analysis of events produced from emulation of a plurality of sample programs carried out by a remote service, wherein the remote service constructs a plurality of sample programs based on a plurality of known program development tools, performs automated assessment of the plurality of sample programs and records events occurring as a result of the assessment in a remote service event log, and formulates a set of rules for distinguishing events from among the event log that are determined to be insignificant with respect to malware detection processing to be performed.

23. The security arrangement of claim 22, further comprising:

an event filtering rules update module executable on the computing hardware and configured to obtain, via the input/output facilities, updates to the event filtering rules database from the remote service.

24. The security arrangement of claim 22, wherein the tracing module includes an isolated execution environment in which the unknown program is assessed.

25. The security arrangement of claim 22, wherein the tracing module includes at least one of: a disassemble, a tracer, an emulator, or any combination thereof.

26. The security arrangement of claim 22, further comprising:

a malware analyzer module configured to analyze events of the filtered event log and generate an assessment of risk associated with the unknown program.

* * * * *